United States Patent
Suri et al.

(10) Patent No.: US 9,723,071 B2
(45) Date of Patent: Aug. 1, 2017

(54) HIGH BANDWIDTH PEER-TO-PEER SWITCHED KEY-VALUE CACHING

(71) Applicant: Samsung Electronics Co., Ltd., Suwon-si, Gyeonggi-do (KR)

(72) Inventors: Tameesh Suri, San Jose, CA (US); Manu Awasthi, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 240 days.

(21) Appl. No.: 14/595,172

(22) Filed: Jan. 12, 2015

(65) Prior Publication Data

US 2016/0094638 A1 Mar. 31, 2016

Related U.S. Application Data

(60) Provisional application No. 62/057,197, filed on Sep. 29, 2014.

(51) Int. Cl.
*G06F 15/16* (2006.01)
*H04L 29/08* (2006.01)
*H04L 12/801* (2013.01)

(52) U.S. Cl.
CPC .......... *H04L 67/104* (2013.01); *H04L 47/193* (2013.01); *H04L 67/2842* (2013.01)

(58) Field of Classification Search
CPC ............... H04L 67/104; H04L 67/2842; H04L 29/06136; H04L 69/161; H04L 47/193
USPC .................................................. 709/232, 203
See application file for complete search history.

(56) References Cited

U.S. PATENT DOCUMENTS

| | | | |
|---|---|---|---|
| 7,966,343 B2 | 6/2011 | Yang et al. | |
| 2004/0044727 A1* | 3/2004 | Abdelaziz | H04L 61/3065 709/203 |
| 2013/0226955 A1 | 8/2013 | Fang et al. | |
| 2013/0290462 A1 | 10/2013 | Lim et al. | |
| 2013/0318119 A1* | 11/2013 | Dalal | G06F 13/16 707/769 |
| 2013/0343408 A1* | 12/2013 | Cook | H04L 29/06136 370/474 |
| 2014/0108726 A1* | 4/2014 | Laurich | G06F 21/602 711/114 |

(Continued)

*Primary Examiner* — Frantz Jean
(74) *Attorney, Agent, or Firm* — Renaissance IP Law Group LLP

(57) ABSTRACT

Inventive aspects include a high bandwidth peer-to-peer switched key-value system, method, and section. The system can include a high bandwidth switch, multiple network interface cards communicatively coupled to the switch, one or more key-value caches to store a plurality of key-values, and one or more memory controllers communicatively coupled to the key-value caches and to the network interface cards. The memory controllers can include a key-value peer-to-peer logic section that can coordinate peer-to-peer communication between the memory controllers and the multiple network interface cards through the switch. The system can further include multiple transmission control protocol (TCP) offload engines that are each communicatively coupled to a corresponding one of the network interface cards. Each of the TCP offload engines can include a packet peer-to-peer logic section that can coordinate the peer-to-peer communication between the memory controllers and the network interface cards through the switch.

18 Claims, 7 Drawing Sheets

(56) References Cited

U.S. PATENT DOCUMENTS

2014/0133228 A1   5/2014  Sprouse et al.
2016/0094667 A1*  3/2016  Jani .................. H04L 69/32
                                                        709/202

* cited by examiner

HIGH BANDWIDTH PEER-TO-PEER SWITCHED KEY-VALUE CACHING

RELATED APPLICATION DATA

This application claims the benefit of U.S. Patent Application Ser. No. 62/057,197, filed Sep. 29, 2014, which is hereby incorporated by reference.

BACKGROUND

The present inventive concepts relate to computerized key-value caching, and more particularly, to a high bandwidth peer-to-peer switched key-value system and method.

The Internet is a vast network of interconnected computers, which continues to expand at a rapid pace. Millions of websites are accessible through the Internet. Some of the more popular websites experience millions of hits, sometimes within a single day. Large pools of servers are deployed to handle such traffic. The pools of servers run software applications to manage the high number of requests. Such software applications can include Memcached, which is an open source memory object caching software application, and which is designed to access key-value caches or stores.

Key-value stores are widely used as web caching tiers, and Memcached is perhaps the most popular deployment. In order to effectively serve as web caches, Memcached servers support large memory capacities. However, server throughput is currently limited and bottlenecked by the network (i.e., physical 10 GbE and the operating system network stack), leaving several other resources such as memory bandwidth severely underutilized. The problem is exacerbated when several popular web applications and/or users request the same set of data cached by a single Memcached node. In order to meet latency service level agreements (SLAs), the most popular way to increase effective throughput is by replicating the Memcached servers. This solution neither addresses the efficiency problems in each Memcached server, nor is it cost-effective. Embodiments of the inventive concept address these and other limitations in the prior art.

BRIEF SUMMARY

Embodiments of the inventive concept include a high bandwidth peer-to-peer switched key-value section, which can include a switch, a plurality of network interface cards communicatively coupled to the switch, one or more key-value caches configured to store a plurality of key-values, one or more memory controllers communicatively coupled to the one or more key-value caches and to the plurality of network interface cards, the one or more memory controllers including a key-value peer-to-peer logic section that is configured to coordinate peer-to-peer communication between the one or more memory controllers and the plurality of network interface cards through the switch, and a plurality of transmission control protocol (TCP) offload engines each communicatively coupled to a corresponding one of the network interface cards, each of the TCP offload engines including a packet peer-to-peer logic section that is configured to coordinate the peer-to-peer communication between the one or more memory controllers and the plurality of network interface cards through the switch.

Embodiments of the inventive concept include a computer-implemented method for high bandwidth peer-to-peer switched key-value caching. The method can include receiving, by a transmission control protocol (TCP) offload engine, a packet. The method can include decoding, by a packet peer-to-peer logic section of the TCP offload engine, the packet. The method can include extracting, by the packet peer-to-peer logic section, a key and a command from the packet. The method can include creating, by the packet peer-to-peer logic section, a peer-to-peer query packet including the extracted key, the extracted command, a destination identifier (ID), and a source identifier (ID). The method can include associating, by the packet peer-to-peer logic section, the destination identifier (ID) of the peer-to-peer query packet with a memory controller. The method can include associating, by the packet peer-to-peer logic section, the source identifier (ID) of the peer-to-peer query packet with a network interface card that is communicatively coupled to the TCP offload engine. The method can include transmitting, by the packet peer-to-peer logic section, the peer-to-peer query packet. The method can include receiving, by a key-value peer-to-peer logic section of the memory controller, the peer-to-peer query packet. The method can include extracting, by the key-value peer-to-peer logic section, the key from the peer-to-peer query packet. The method can include referencing, by the key-value peer-to-peer logic section, a hash table using the key to determine at least one of a hit or a miss. The method can include responsive to determining the hit, determining a value associated with the hit, creating a peer-to-peer return packet including the value, and transmitting the peer-to-peer return packet to the network interface card that is communicatively coupled to the TCP offload engine. The method can include receiving, by the packet peer-to-peer logic section of the TCP offload engine, the peer-to-peer return packet from the network interface card. The method can include creating, by the packet peer-to-peer logic section, a TCP packet based at least on the peer-to-peer return packet. The method can include transmitting, by the packet peer-to-peer logic section, the TCP packet.

Certain of the inventive features may be best achieved by implementing them in association with a processor such as within an ARM processor core, an x86 processor core, or the like. Other types of memory modules, processors, application specific integrated circuits (ASICs), and/or firmware can implement the inventive principles disclosed herein. The inventive concepts may be implemented within processors and/or memory modules in a variety of stationary devices such as servers, desktop computers, routers, or the like.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first power switch cell could be termed a second power switch cell, and, similarly, a second power switch cell could be termed a first power switch cell, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept include methods and systems for increasing throughput of key-value web caching. Such methods and systems can include the integration of one or more memory controllers, one or more network interface cards or controllers, one or more offload engines, and/or associated embedded logic, on a high bandwidth switching fabric.

The embodiments of the inventive concept disclosed herein provide a scalable architecture to increase memory capacity and bandwidth per server for better throughput of web caching key-value software, such as Memcached. The architecture significantly reduces the total cost of ownership for large Memcached deployments, by reducing the number of replicated servers.

Figure 1:
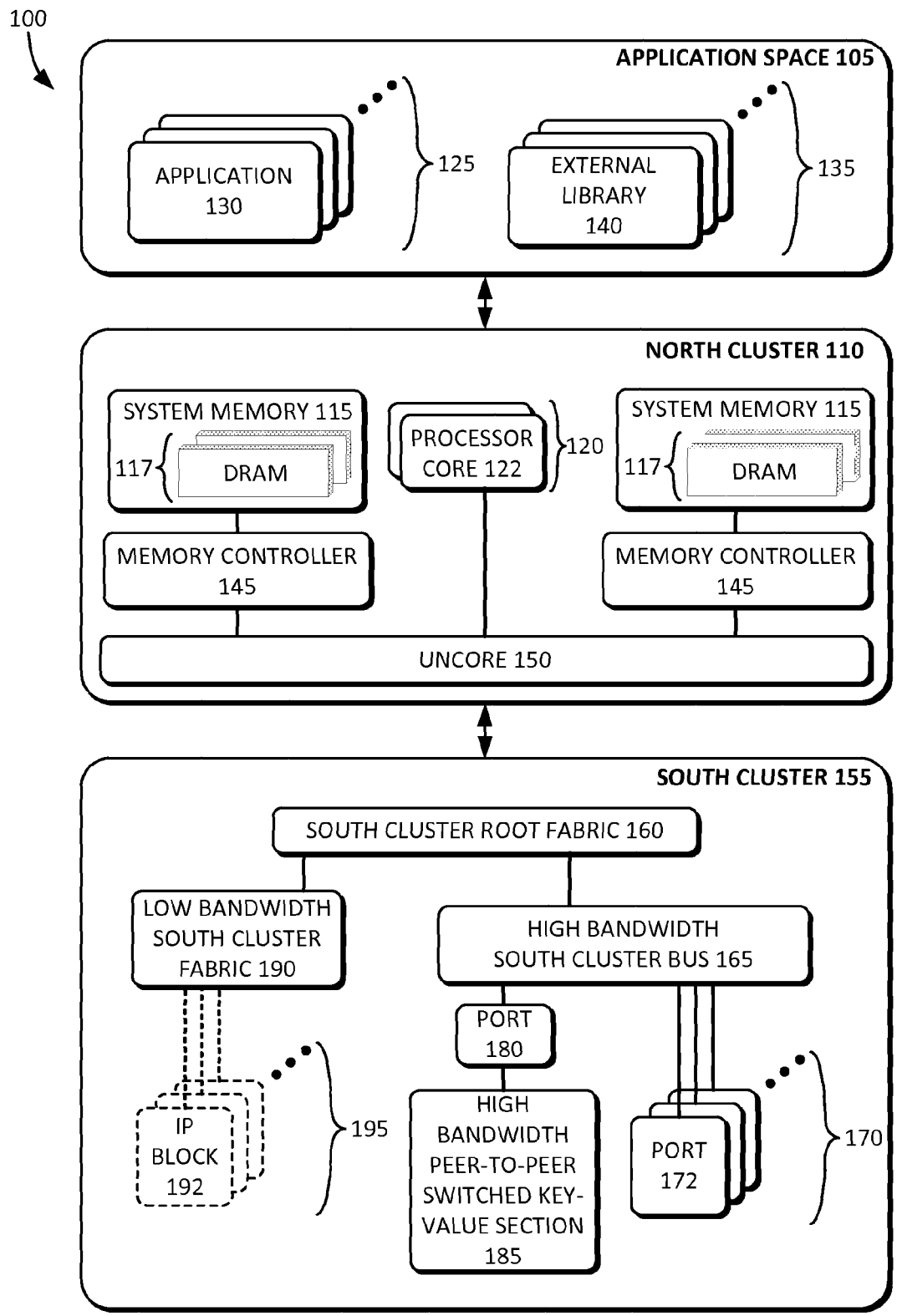
FIG. 1 is an example block diagram of a system including a high bandwidth peer-to-peer switched key-value section in accordance with embodiments of the inventive concept.

FIG. 1 is an example block diagram of a system 100 including a high bandwidth peer-to-peer switched key-value section 185 in accordance with embodiments of the inventive concept. The high bandwidth peer-to-peer switched key-value system 100 can include an application space 105, a north cluster 110, and a south cluster 155. The application space 105 can include one or more applications 125, such as application 130, and one or more external libraries 135, such as external library 140. The one or more applications 125 can include, for example, Memcached, which is an open source memory object caching software application. The one or more external libraries 135 can include, for example, an application specific interface (API) for interfacing with the high bandwidth peer-to-peer switched key-value section 185 in accordance with the inventive concept, as further described below. For example, the API can include an extensible set of software APIs for various functions, including a malloc command and a hash mask ability to facilitate the communication between the host application (e.g., 125) and the high bandwidth peer-to-peer switched key-value section 185, as further described below. For example, rather than use a typical malloc command, a specialized pci_malloc command can be provided and used by the application 130, so that the application 130 can allocate memory within a key-value cache of the high bandwidth peer-to-peer switched key-value section 185.

The north cluster 110 can include one or more processor cores 120 such as processor core 122. The one or more processor cores 120 can include, for example, an x86 core, an ARM core or other suitable reduced instruction set computing (RISC) processor cores, or other suitable cores. The north cluster 110 can include an uncore section 150, which can have L3 cache, interconnect, or other controllers that are essential to core performance, but not part of the processor cores 120. The north cluster 110 can also include one or more memory controllers 145, and associated system memory 115. The system memory 115 can include dynamic random access memory (DRAM) modules 117. The one or more memory controllers 145 can control the system memory 115. The components of the north cluster 110 facilitate the operation and execution of the applications 125 and external libraries 135.

The south cluster 155 can include a south cluster root fabric 160. The south cluster root fabric 160 can be a Peripheral Component Interconnect Express (PCIe) root fabric, although it will be understood that other suitable high bandwidth fabrics can be used. The south cluster 155 can include a high bandwidth south cluster bus 165 that is communicatively coupled to the south cluster root fabric 160. The south cluster bus 165 can have multiple ports 170 such as port 172 and port 180. The ports 170 can be PCIe ports, although it will be understood that other suitable high speed ports can be used. The south cluster 155 can include the peer-to-peer switched key-value section 185 that is communicatively coupled to the port 180 of the high bandwidth south cluster bus 165. A low bandwidth south cluster fabric 190 can be communicatively coupled to the south cluster root fabric 160, and can receive and transmit internet protocol (IP) blocks 195, such as IP block 192. The high bandwidth south cluster bus 165 can have a bandwidth that is higher relative to the low bandwidth south cluster fabric 190.

Figure 2:
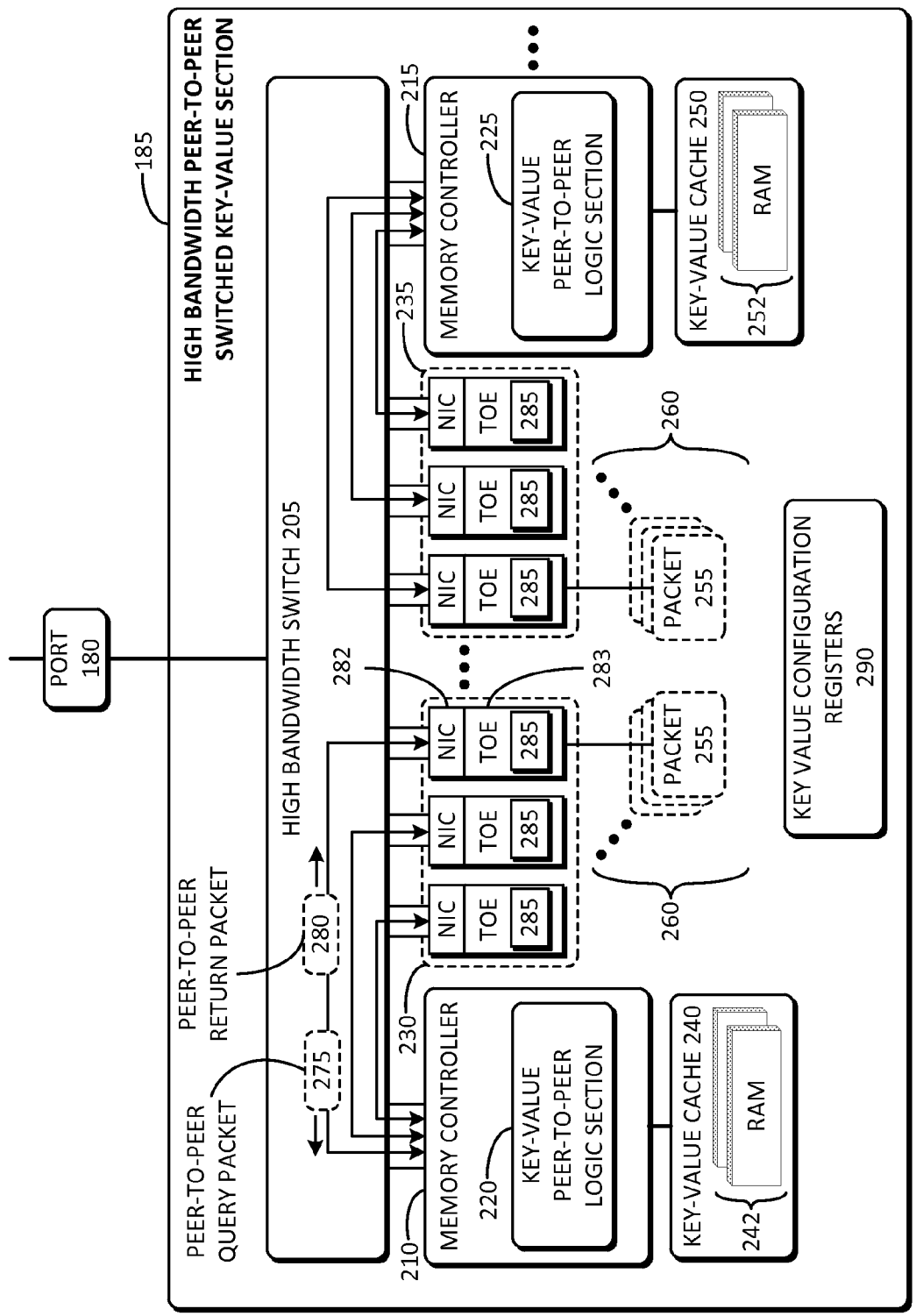
FIG. 2 is an example block diagram of the high bandwidth peer-to-peer switched key-value section of FIG. 1.
Figure 3:
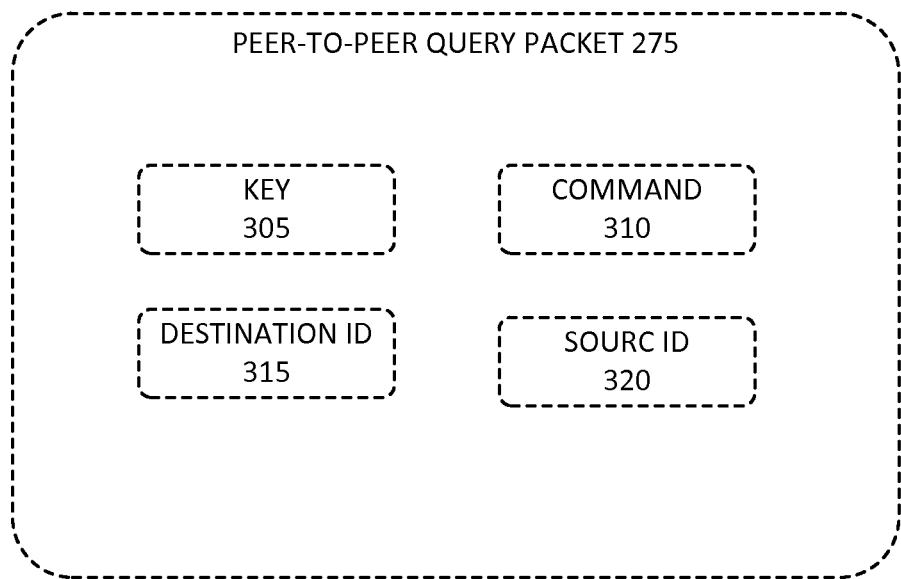
FIG. 3 is an example diagram of a peer-to-peer query packet in accordance with embodiments of the inventive concept.
Figure 4:
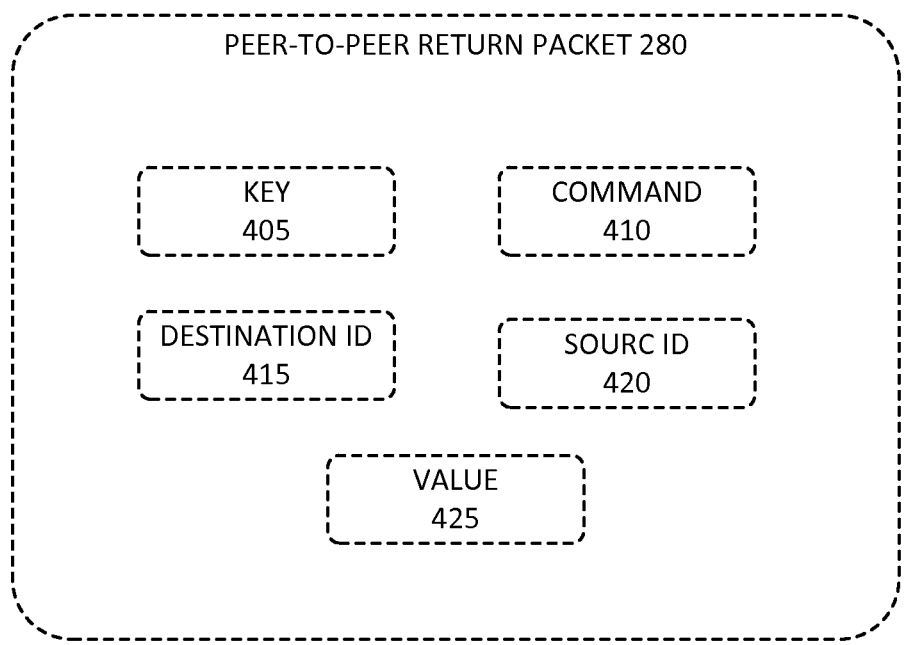
FIG. 4 is an example diagram of a peer-to-peer return packet in accordance with embodiments of the inventive concept.

FIG. 2 is an example block diagram of a more detailed view of the high bandwidth peer-to-peer switched key-value section 185 of FIG. 1. FIG. 3 is an example diagram of a peer-to-peer query packet 275 in accordance with embodiments of the inventive concept. FIG. 4 is an example diagram of a peer-to-peer return packet 280 in accordance with embodiments of the inventive concept. Reference is now made to FIGS. 2 through 4.

The peer-to-peer switched key-value section 185 can include a high bandwidth switch 205 having a bandwidth that is higher relative to the low bandwidth south cluster fabric 190 (of FIG. 1). The high bandwidth switch 205 can include a high bandwidth Peripheral Component Interconnect Express (PCIe) fabric, or other suitable high bandwidth fabric.

The peer-to-peer switched key-value section 185 can include one or more key-value caches (e.g., 240 and 250) to store key-values. The key-values can be stored in random access memory modules (e.g., 242 and 252). The random access memory modules can include DRAM modules, NAND flash modules, magnetoresistive random access memory (MRAM) modules, phase-change memory (PRAM) modules, resistive type memory modules, or the like. The peer-to-peer switched key-value section 185 can include one or more memory controllers (e.g., 210 and 215) that are communicatively coupled to the one or more key-value caches (e.g., 240 and 250) and to network interface cards (NICs), such as NIC 282. The one or more memory controllers (e.g., 210 and 215) can each include a key-value peer-to-peer logic section (e.g., 220 and 225) that can coordinate peer-to-peer communication between the one or more memory controllers (e.g., 210) and the NICs (e.g., 282) through the switch 205.

The peer-to-peer switched key-value section 185 can include multiple NICs that are communicatively coupled to the switch 205. The peer-to-peer switched key-value section 185 can include multiple transmission control protocol (TCP) offload engines (TOEs) that are each communicatively coupled to a corresponding one of the NICs. Each of the TOEs (e.g., 283) can include a packet peer-to-peer logic section 285 that is configured to coordinate the peer-to-peer communication between one or more memory controllers (e.g., 210) and a corresponding NIC (e.g., 282) through the switch 205. The TOEs can receive and transmit external TCP packets (i.e., external relative to the system 100). The NICs and TOEs can be 10 gigabit Ethernet (GbE) capable, for example. It will be understood that the NICs and TOEs can have different or better performance characteristics and still fall within the disclosed embodiments of the inventive concept.

The NICs can include a first group of NICs 230 and a second group of NICs 235. The one or more memory controllers can include a first memory controller 210 and a second memory controller 215. It will be understood that three or more memory controllers can be present, as indicated by the ellipsis. The first group of NICs 230 can be associated with the first memory controller 210. In other words, the first group of NICs 230 can be assigned to or otherwise configured to communicate with the first memory controller 210. Similarly, the second group of NICs 235 can be associated with the second memory controller 215. In other words, the second group of NICs 235 can be assigned to or otherwise configured to communicate with the second memory controller 215.

The first memory controller 210 can include a first key-value peer-to-peer logic section 220. The second memory controller 215 can include a second key-value peer-to-peer logic section 225. The first key-value peer-to-peer logic section 220 can coordinate the peer-to-peer communication between the first memory controller 210 and the first group of NICs 230 through the switch 205. The second key-value peer-to-peer logic section 225 can coordinate the peer-to-peer communication between the second memory controller 215 and the second group of NICs 235 through the switch 205. While each group (e.g., 230 and 235) shows three NICs, it will be understood that any suitable number of NICs can be included in each group.

The packet peer-to-peer logic section 285 for a particular TOE 283 can receive a packet 255 from among the packets 260. For example, the packet 255 can be a TCP packet. By way of another example, the packet can be a GET packet. The packet peer-to-peer logic section 285 for the particular TOE 283 can decode the packet 255, extract a key 305 and a command 310, and create a peer-to-peer query packet 275, as illustrated in FIGS. 2 and 3. The peer-to-peer query packet 275 can be a PCIe packet. The peer-to-peer query packet 275 can include the key 305, the command 310, a destination identifier (ID) 315, and a source identifier (ID) 320. The packet peer-to-peer logic section 285 for the particular TOE 283 can associate the destination ID 315 of the peer-to-peer query packet 275 with the memory controller 210. The packet peer-to-peer logic section 285 for the particular TOE 283 can associate the source ID 320 of the peer-to-peer query packet 275 with a corresponding NIC 282 that is communicatively coupled to the particular TOE 283. The corresponding NIC 282 can transmit the peer-to-peer query packet 275 to the memory controller 210.

The key-value peer-to-peer logic section 220 of the memory controller 210 can receive the peer-to-peer query packet 275 from the corresponding NIC 282. The key-value peer-to-peer logic section 220 can extract the key 305 from the peer-to-peer query packet 275. The key-value peer-to-peer logic section 220 can reference a hash table residing in the key-value cache 240 using the key 305 to determine at least one of a hit or a miss. In some embodiments, some or all of the hash table can reside in high speed (e.g., SRAM) memory within the high bandwidth switch 205 to enable a faster lookup (e.g., hit/miss). Responsive to the hit, the key-value peer-to-peer logic section 220 can determine a value 425 associated with the hit, and create a peer-to-peer return packet 280 including the value 425, as illustrated in FIGS. 2 and 4. The peer-to-peer return packet 280 can be a PCIe packet. The peer-to-peer return packet 280 can include a key 405, a command 410, a destination ID 415, and/or a source ID 420. The destination ID 415 can be set to the NIC 282, and the source ID 420 can be set to the memory controller 210. The key 405 can be the same for the query and return packets, which is used to identify the packet. Alternatively, a smaller request buffer ID can be used to identify the packets. The command 410 can be the same as the command 310, although the command is not necessarily needed in the return packet 280. The memory controller 210 can transmit the peer-to-peer return packet 280 to the corresponding NIC 282 that is communicatively coupled to the particular TOE 283.

The packet peer-to-peer logic section 285 for the particular TOE 283 can receive the peer-to-peer return packet 280 from the corresponding NIC 282, create a TCP packet (e.g., 260) based at least on the peer-to-peer return packet 280, and transmit the TCP packet to an external device or system.

The key-value peer-to-peer logic section 220 can access one or more externally modifiable key-value configuration registers 290. The one or more a key-value configuration registers 290 can be accessible by the one or more applications 125 or the one or more external libraries 135 (of FIG. 1), and/or by the one or more memory controllers (e.g., 210 and 215) of the peer-to-peer switched key-value section 185.

Most of the high bandwidth communication, i.e., from NIC(s) to the memory controller(s) and back, is confined within the switching fabric 205. The upstream port 180 can be used to communicate with the host web caching/Memcached software (e.g., 130). The key-value cache (e.g., 240) in a high-bandwidth environment, having a direct access path through the switch 205, provides much faster round-trip latency and better scalability, since it is not dependent on the low bandwidth I/O hub (e.g., 190 of FIG. 1), the uncore (150 of FIG. 1), or system memory bandwidth (e.g., 117 of FIG. 1) and interconnect architecture limitations. Moderate upstream bandwidth requirements enable better scaling of the architecture. For example, the peer-to-peer switched key-value section 185 can communicate with the one or more applications 125 or the one or more external libraries 135 via the north cluster 110, but in a moderate fashion, where the high bandwidth transfers are handled within the peer-to-peer switched key-value section 185. The architecture in accordance with embodiments of the inventive concept is configurable, and based on the network-to-memory bandwidth utilization, can have one or many 10 Gbe NICs communicate with a single memory controller, for example, using PCIe peer-to-peer routing as disclosed herein, to achieve high throughput and efficiency.

Figure 5:
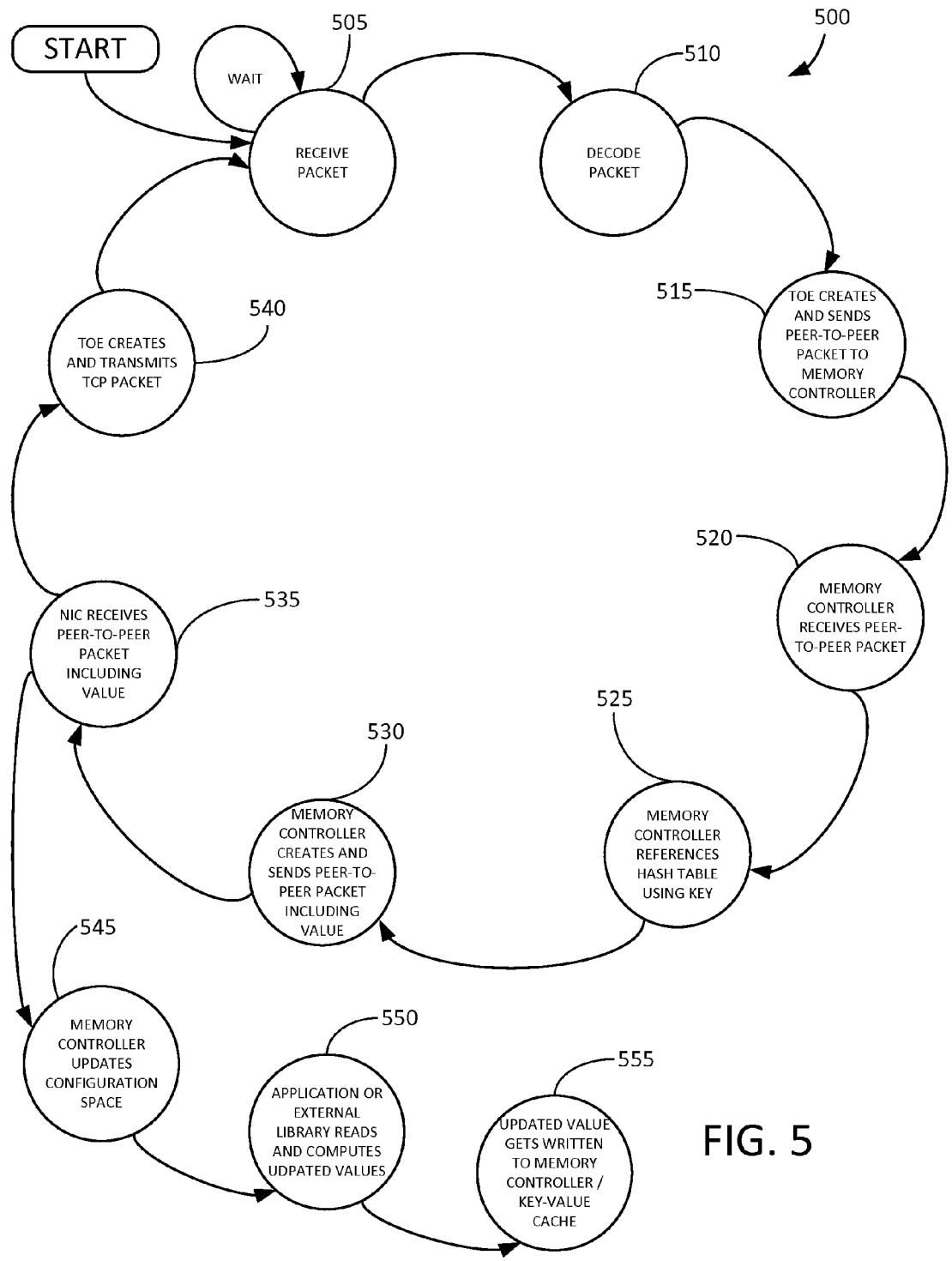
FIG. 5 is a flow diagram illustrating a technique for performing high bandwidth peer-to-peer switched key-value caching in accordance with embodiments of the inventive concept.

FIG. 5 is a flow diagram 500 illustrating a technique for performing high bandwidth peer-to-peer switched key-value caching in accordance with embodiments of the inventive concept. The technique begins at 505, where the system waits until a packet, such as a GET packet, arrives at the physical layer. A particular TOE can decode the packet at 510, and a key and command extracted from the packet. At 515, the particular TOE can create and send a peer-to-peer query packet to a particular memory controller. The peer-to-peer query packet can be a PCIe packet. The peer-to-peer query packet can include the extracted key and command, as well as a destination ID set to the particular memory controller, and a source ID set to a corresponding NIC. At 520, the memory controller can receive the peer-to-peer query packet, and can maintain the source ID for the transaction. The key-value peer-to-peer logic section (e.g., 220 of FIG. 2) can create a hash or hash function, which can be defined by the one or more applications (e.g., 125 of FIG. 1). For example, the hash or hash function can be defined by Memcached using the key-value configuration registers 290, which may reside in PCIe space. The hash function can be created using a bit mask that can be obtained from the key-value configuration registers 290 (of FIG. 2). The one or more applications (e.g., 125) can write the bit mask to the key-value configuration registers 290. Although any application (e.g., 125) can write to the key-value configuration registers 290, it is a preferable that a single designated application do so to avoid unexpected behavior, given that the key-value configuration registers 290 can define the global state of the system. The key-value peer-to-peer logic section (e.g., 220 of FIG. 2) of the particular memory controller can look up or otherwise reference a hash table at 525 to determine whether there is a hit or miss. The hash table can be referenced using the key. In response to a hit, the memory controller can determine the value. At 530, the memory controller can create a peer-to-peer return packet, including the value on the hit if any, and send it to the particular NIC. At 535, the particular NIC can receive, based on the source ID, the peer-to-peer return packet including the value on the hit if any. At 540, the particular TOE can create a TCP packet and send out the response. The flow returns to 505, where another packet can be received, and the process continued.

In the meanwhile, the memory controller can update the key-value configuration registers 290 at 545. More specifically, the memory controller can write least recently used (LRU) bucket values to the key-value configuration registers 290. At 550, the one or more application 125 (of FIG. 1) can access and generate updated values, metadata, or the like. At 555, the updated values can be written to the memory controller and/or key-value cache (e.g., 240 of FIG. 2). The process shown at 545, 550, and 555 can occur in parallel to other operations. For example, the flow can proceed to 540 and then to 505 for another packet, while the processes at 545, 550, and 555 are being executed.

Figure 6:
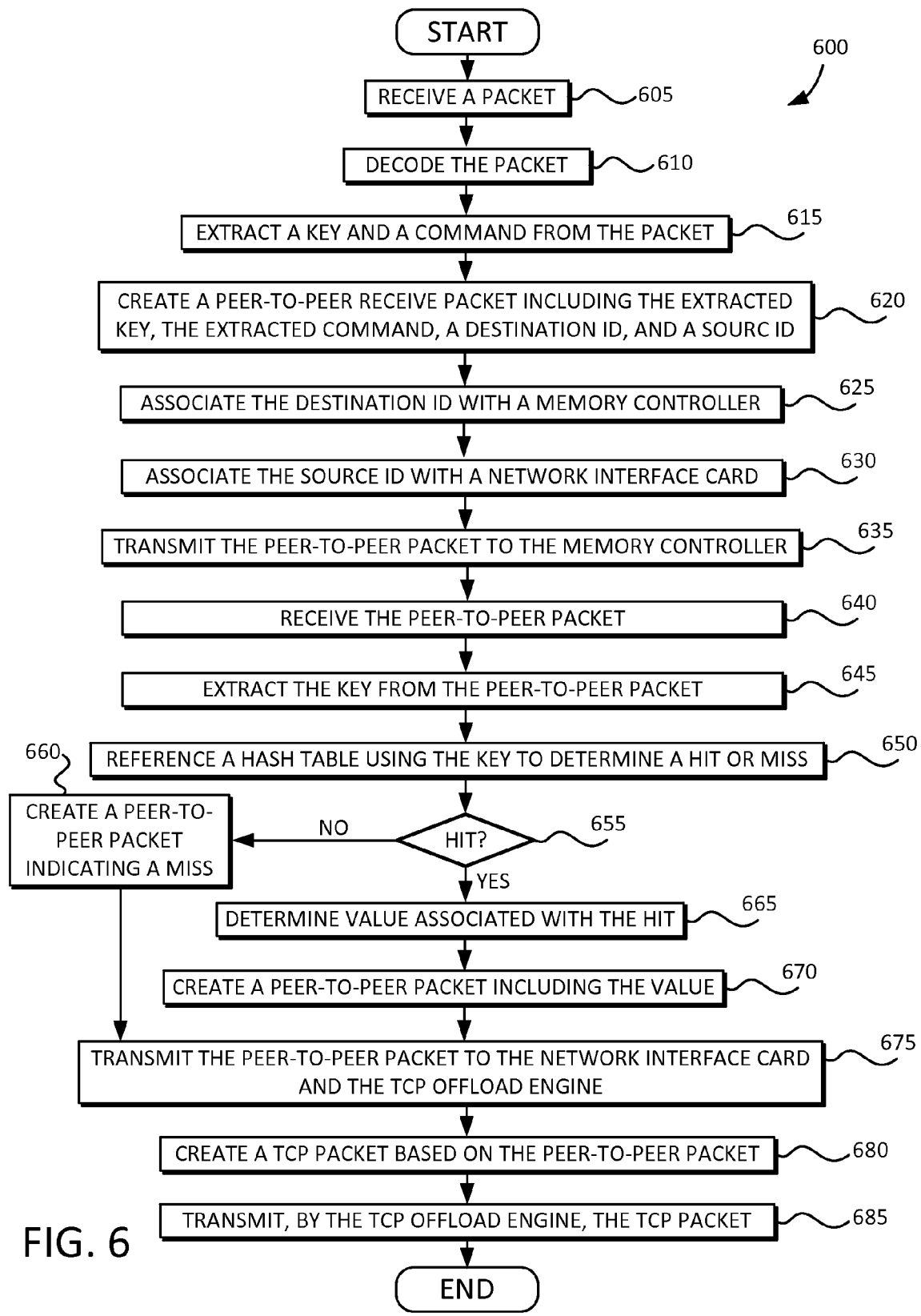
FIG. 6 is a flow diagram illustrating another technique for performing high bandwidth peer-to-peer switched key-value caching in accordance with embodiments of the inventive concept.

FIG. 6 is a flow diagram 600 illustrating another technique for performing high bandwidth peer-to-peer switched key-value caching in accordance with embodiments of the inventive concept. The technique begins at 605, where a packet (e.g., 255 of FIG. 2) can be received, by a particular TOE (e.g., 283 of FIG. 2). At 610, a packet peer-to-peer logic section (e.g., 285 of FIG. 2) of the particular TOE can decode the packet. At 615, the packet peer-to-peer logic section can extract a key (e.g., 305 of FIG. 3) and a command (e.g., 310 of FIG. 3) from the packet. At 620, the packet peer-to-peer logic section can create a peer-to-peer query packet (e.g., 275 of FIG. 2) including the extracted key, the extracted command, a destination ID (e.g., 315 of FIG. 3), and a source ID (e.g., 320 of FIG. 3). At 625, the packet peer-to-peer logic section can associate the destination ID of the peer-to-peer query packet with a memory controller (e.g., 210 of FIG. 2). At 630, the packet peer-to-peer logic section can associate the source ID of the peer-to-peer query packet with a NIC (e.g., 282 of FIG. 2) that is communicatively coupled to the TOE.

The flow proceeds to 635, where the NIC can transmit the peer-to-peer query packet to the memory controller. At 640, a key-value peer-to-peer logic section (e.g., 220 of FIG. 2) of the memory controller can receive the peer-to-peer query packet. At 645, the key-value peer-to-peer logic section can extract the key from the peer-to-peer query packet. At 650, the key-value peer-to-peer logic section can reference a hash table using the key to determine at least one of a hit or a miss. At 655, a determination can be made whether there is a hit or miss in the hash table. If YES, meaning there is a hit, the flow can proceed to 665, where a value associated with the hit can be determined. At 670, a peer-to-peer return packet (e.g., 280 of FIG. 2) can be created, which includes the value. At 675, the key-value peer-to-peer logic section can transmit the peer-to-peer return packet to the NIC that is communicatively coupled to the particular TOE.

Referring back to 655, if the determination is NO, meaning that a miss occurred, the flow proceeds to 660, where a peer-to-peer return packet can be created without the value. In other words, the peer-to-peer return packet can indicate a miss. From there, the flow can proceed to 675, where the peer-to-peer return packet can be transmitted to the NIC and/or the TOE.

At 680, the packet peer-to-peer logic section of the TOE can receive the peer-to-peer return packet from the NIC, and create a TCP packet based at least on the peer-to-peer return packet. At 685, the packet peer-to-peer logic section of the TOE can transmit the TCP packet to a device or system that is external to the system 100 (of FIG. 1).

It will be understood that the steps of the technique shown in the flow diagram 600 need not occur in the order shown, but rather, can occur in a different order or with intervening steps.

Figure 7:
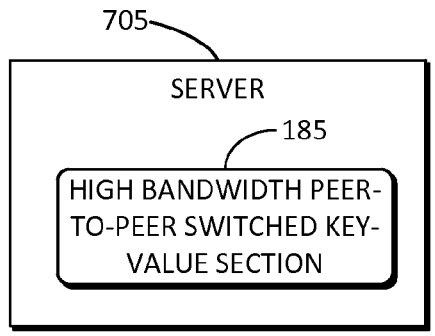
FIG. 7 is an example block diagram of a standalone server including a high bandwidth peer-to-peer switched key-value section in accordance with embodiments of the inventive concept.

FIG. 7 is an example block diagram of a standalone server 705 including the high bandwidth peer-to-peer switched key-value section 185 (of FIGS. 1 and 2) in accordance with embodiments of the inventive concept. In this embodiment, the server 705 includes a single instance of the high bandwidth peer-to-peer switched key-value section 185. The high bandwidth peer-to-peer switched key-value section 185 can be direct-attached to the server 705 and/or included within the server 705.

Figure 8:
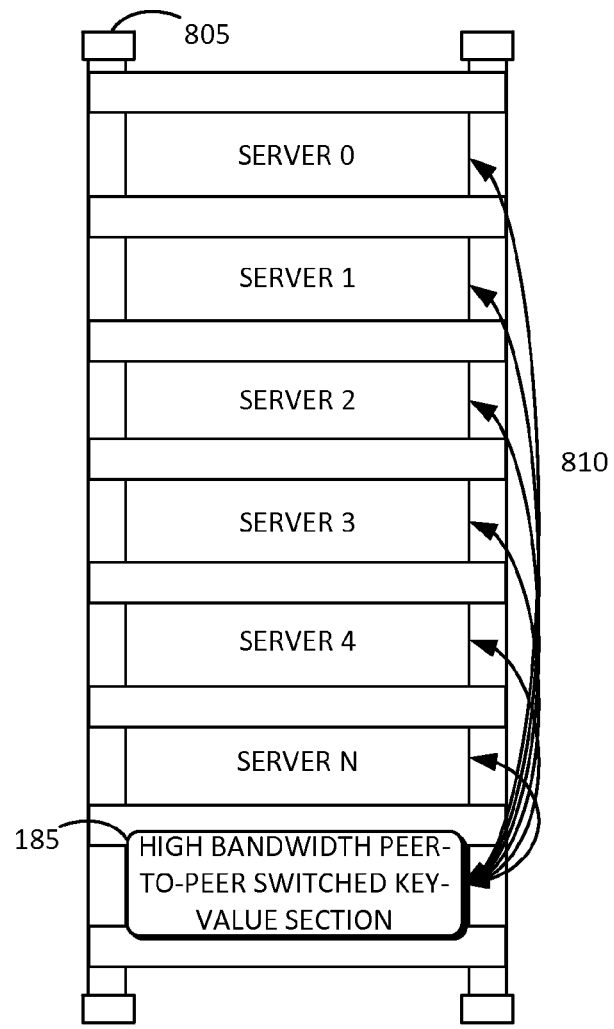
FIG. 8 is an example block diagram of multiple servers associated with a single high bandwidth peer-to-peer switched key-value section in accordance with embodiments of the inventive concept.

FIG. 8 is an example block diagram of multiple servers (e.g., servers 0, 1, through N) in a rack 805 associated with a single high bandwidth peer-to-peer switched key-value section 185 in accordance with embodiments of the inventive concept. In this distributed configuration, the high bandwidth peer-to-peer switched key-value section 185 can provide a high bandwidth key-value cache for each of the servers. For example, the servers can communicate with the high bandwidth peer-to-peer switched key-value section 185 via external cables 810. The external cables 810 can be PCIe cables, for example. It will be understood that other suitable high bandwidth cables can be used.

Figure 9:
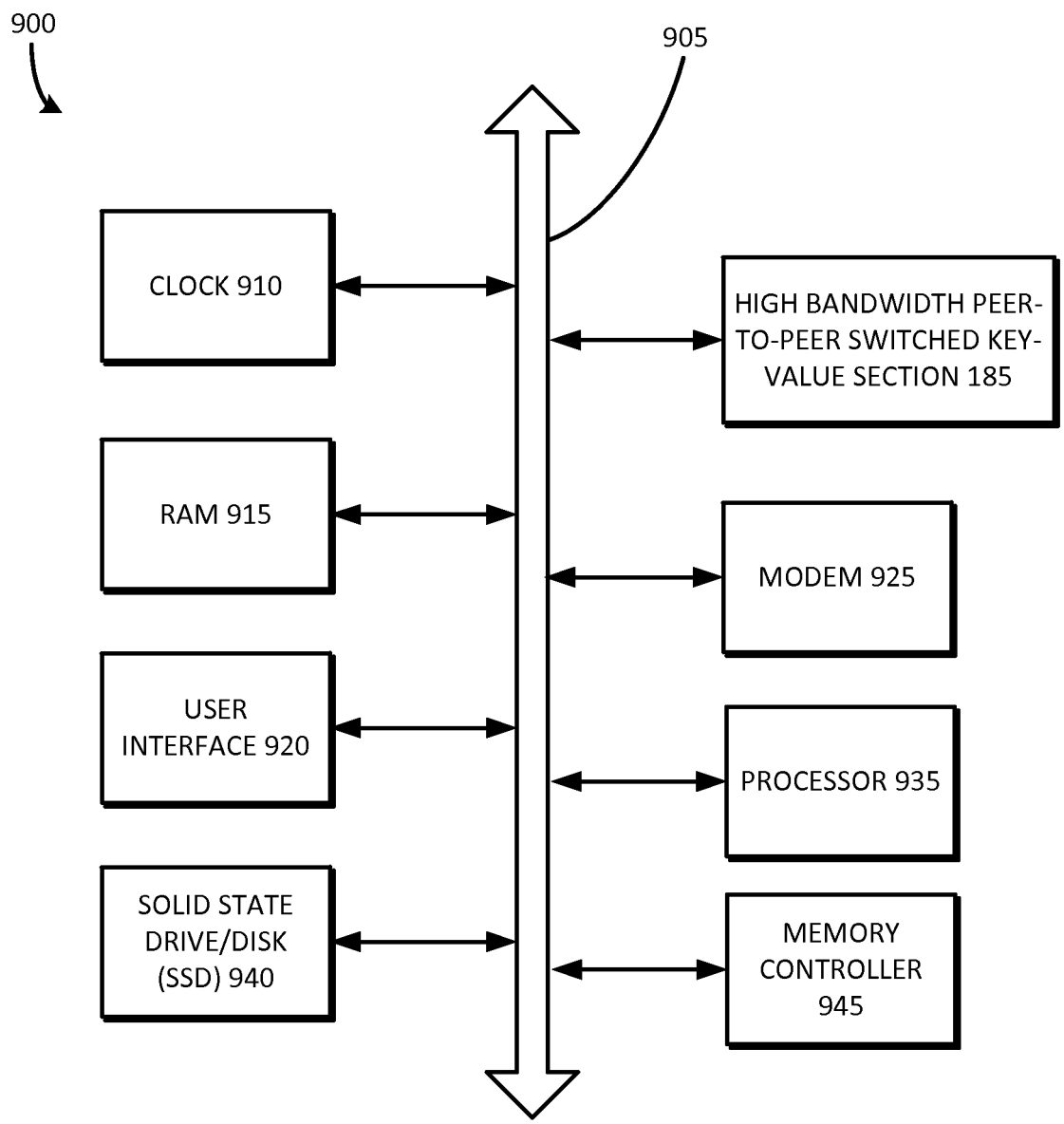
FIG. 9 is a block diagram of a computing system including the high bandwidth peer-to-peer switched key-value section of FIG. 1 according to embodiments of the inventive concept as disclosed herein.

FIG. 9 is a block diagram of a computing system 900 including the high bandwidth peer-to-peer switched key-value section 185 of FIG. 1 according to embodiments of the inventive concept as disclosed herein.

Referring to FIG. 9, the computing system 900 may also include a clock 910, a random access memory (RAM) 915, a user interface 920, a modem 925 such as a baseband chipset, a solid state drive/disk (SSD) 940, a memory controller 945, and/or a processor 935, any or all of which may be electrically coupled to a system bus 905. The high bandwidth peer-to-peer switched key-value section 185 can correspond to that described in detail above, and as set forth herein, and may also be electrically coupled to the system bus 905.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A high bandwidth peer-to-peer switched key-value section, comprising:
    a switch;
    a plurality of network interface cards communicatively coupled to the switch;
    one or more key-value caches configured to store a plurality of key-values;

one or more memory controllers communicatively coupled to the one or more key-value caches and to the plurality of network interface cards, the one or more memory controllers including a key-value peer-to-peer logic section that is configured to coordinate peer-to-peer communication between the one or more memory controllers and the plurality of network interface cards through the switch; and a plurality of transmission control protocol (TCP) offload engines each communicatively coupled to a corresponding one of the network interface cards, each of the TCP offload engines including a packet peer-to-peer logic section that is configured to coordinate the peer-to-peer communication between (a) the one or more memory controllers and (b) the plurality of network interface cards through the switch, wherein the key-value peer-to-peer logic section for a particular memory controller from among the one or more memory controllers is configured to:
receive a peer-to-peer query packet from a corresponding network interface card that is communicatively coupled to a particular TCP offload engine;
extract a key from the peer-to-peer query packet;
reference a hash table using the key to determine at least one of a hit or a miss;
responsive to the hit:
determine a value associated with the hit;
create a peer-to-peer return packet including the value; and
transmit the peer-to-peer return packet to the corresponding network interface card that is communicatively coupled to the particular TCP offload engine.

2. The high bandwidth peer-to-peer switched key-value section of claim 1, wherein:
the plurality of network interface cards includes a first group of network interface cards and a second group of network interface cards;
the one or more memory controllers includes a first memory controller and a second memory controller;
the first group of network interface cards are associated with the first memory controller; and
the second group of network interface cards are associated with the second memory controller.

3. The high bandwidth peer-to-peer switched key-value section of claim 2, wherein:
the key-value peer-to-peer logic section is referred to as a first key-value peer-to-peer logic section;
the first memory controller includes the first key-value peer-to-peer logic section;
the second memory controller includes a second key-value peer-to-peer logic section;
the first key-value peer-to-peer logic section is configured to coordinate the peer-to-peer communication between (a) the first memory controller and (b) the first group of network interface cards from among the plurality of network interface cards through the switch; and
the second key-value peer-to-peer logic section is configured to coordinate the peer-to-peer communication between (a) the second memory controller and (b) the second group of network interface cards from among the plurality of network interface cards through the switch.

4. The high bandwidth peer-to-peer switched key-value section of claim 1, wherein:
the packet peer-to-peer logic section for the particular TCP offload engine from among the plurality of TCP offload engines is configured to receive a packet, to decode the packet, to extract the key and a command, and to create the peer-to-peer query packet,
the peer-to-peer query packet includes the key, the command, a destination identifier (ID), and a source identifier (ID), and the packet peer-to-peer logic section for the particular TCP offload engine is configured to:
associate the destination ID of the peer-to-peer query packet with a memory controller from among the one or more memory controllers; and
associate the source ID of the peer-to-peer query packet with the corresponding network interface card that is communicatively coupled to the particular TCP offload engine.

5. The high bandwidth peer-to-peer switched key-value section of claim 1, wherein the switch includes a Peripheral Component Interconnect Express (PCIe) fabric.

6. The high bandwidth peer-to-peer switched key-value section of claim 1, wherein the key-value peer-to-peer logic section is configured to access one or more externally modifiable key-value configuration registers.

7. A high bandwidth peer-to-peer switched key-value section, comprising:
a switch;
a plurality of network interface cards communicatively coupled to the switch;
one or more key-value caches configured to store a plurality of key-values;
one or more memory controllers communicatively coupled to the one or more key-value caches and to the plurality of network interface cards, the one or more memory controllers including a key-value peer-to-peer logic section that is configured to coordinate peer-to-peer communication between the one or more memory controllers and the plurality of network interface cards through the switch; and
a plurality of transmission control protocol (TCP) offload engines each communicatively coupled to a corresponding one of the network interface cards, each of the TCP offload engines including a packet peer-to-peer logic section that is configured to coordinate the peer-to-peer communication between (a) the one or more memory controllers and (b) the plurality of network interface cards through the switch;
wherein:
the packet peer-to-peer logic section for a particular TCP offload engine from among the plurality of TCP offload engines is configured to receive a packet, to decode the packet, to extract a key and a command, and to create a peer-to-peer query packet,
the peer-to-peer query packet includes the key, the command, a destination identifier (ID), and a source identifier (ID), and
the packet peer-to-peer logic section for the particular TCP offload engine is configured to:
associate the destination ID of the peer-to-peer query packet with a memory controller from among the one or more memory controllers; and
associate the source ID of the peer-to-peer query packet with a corresponding network interface card that is communicatively coupled to the particular TCP offload engine; and
the key-value peer-to-peer logic section for a particular memory controller from among the one or more memory controllers is configured to:

receive the peer-to-peer query packet from the corresponding network interface card that is communicatively coupled to the particular TCP offload engine;
extract the key from the peer-to-peer query packet;
reference a hash table using the key to determine at least one of a hit or a miss;
responsive to the hit:
  determine a value associated with the hit;
  create a peer-to-peer return packet including the value; and
  transmit the peer-to-peer return packet to the corresponding network interface card that is communicatively coupled to the particular TCP offload engine.

8. The high bandwidth peer-to-peer switched key-value section of claim 7, wherein the packet peer-to-peer logic section for the particular TCP offload engine is further configured to:
receive the peer-to-peer return packet from the corresponding network interface card;
create a TCP packet based at least on the peer-to-peer return packet; and
transmit the TCP packet.

9. A high bandwidth peer-to-peer switched key-value system, comprising:
an application space including one or more applications and one or more external libraries;
a north cluster including one or more processor cores, a system memory, and a memory controller configured to control the system memory;
a south cluster including:
  a south cluster root fabric;
  a south cluster bus communicatively coupled to the south cluster root fabric, the south cluster bus having a plurality of ports; and
  a peer-to-peer switched key-value section communicatively coupled to a port from among the plurality of ports of the south cluster bus, the peer-to-peer switched key-value section being configured to communicate with the one or more applications or the one or more external libraries via the north cluster;
wherein the peer-to-peer switched key-value section further includes:
a switch;
a plurality of network interface cards communicatively coupled to the switch;
one or more key-value caches configured to store a plurality of key-values;
one or more memory controllers communicatively coupled to the one or more key-value caches and to the plurality of network interface cards, the one or more memory controllers including a key-value peer-to-peer logic section that is configured to coordinate peer-to-peer communication between (a) the one or more memory controllers and (b) the plurality of network interface cards through the switch; and
a plurality of transmission control protocol (TCP) offload engines each communicatively coupled to a corresponding one of the network interface cards, each of the TCP offload engines including a packet peer-to-peer logic section that is configured to coordinate the peer-to-peer communication between (a) the one or more memory controllers and (b) the plurality of network interface cards through the switch;
wherein the key-value peer-to-peer logic section for a particular memory controller from among the one or more memory controllers is configured to:
receive a peer-to-peer query packet from a corresponding network interface card that is communicatively coupled to a particular TCP offload engine;
extract a key from the peer-to-peer query packet;
reference a hash table using the key to determine at least one of a hit or a miss;
responsive to the hit:
  determine a value associated with the hit;
  create a peer-to-peer return packet including the value; and
  transmit the peer-to-peer return packet to the corresponding network interface card that is communicatively coupled to the particular TCP offload engine.

10. The high bandwidth peer-to-peer switched key-value system of claim 9, further comprising:
one or more a key-value configuration registers accessible by the one or more applications or the one or more external libraries, and by the one or more memory controllers of the peer-to-peer switched key-value section.

11. The high bandwidth peer-to-peer switched key-value system of claim 9, wherein the plurality of TCP offload engines of the peer-to-peer switched key-value section are configured to receive and transmit external TCP packets.

12. The high bandwidth peer-to-peer switched key-value system of claim 9, wherein:
the plurality of network interface cards includes a first group of network interface cards and a second group of network interface cards;
the one or more memory controllers includes a first memory controller and a second memory controller;
the first group of network interface cards are associated with the first memory controller; and
the second group of network interface cards are associated with the second memory controller.

13. The high bandwidth peer-to-peer switched key system of claim 12, wherein:
the key-value peer-to-peer logic section is referred to as a first key-value peer-to-peer logic section;
the first memory controller includes the first key-value peer-to-peer logic section;
the second memory controller includes a second key-value peer-to-peer logic section;
the first key-value peer-to-peer logic section is configured to coordinate the peer-to-peer communication between (a) the first memory controller and (b) the first group of network interface cards from among the plurality of network interface cards through the switch; and
the second key-value peer-to-peer logic section is configured to coordinate the peer-to-peer communication between (a) the second memory controller and (b) the second group of network interface cards from among the plurality of network interface cards through the switch.

14. The high bandwidth peer-to-peer switched key-value system of claim 9, wherein:
the packet peer-to-peer logic section for the particular TCP offload engine from among the plurality of TCP offload engines is configured to receive a packet, to decode the packet, to extract the key and a command, and to create the peer-to-peer query packet,
the peer-to-peer query packet includes the key, the command, a destination identifier (ID), and a source identifier (ID), and
the packet peer-to-peer logic section for the particular TCP offload engine is configured to:

associate the destination ID of the peer-to-peer query packet with a memory controller from among the one or more memory controllers; and associate the source ID of the peer-to-peer query packet with the corresponding network interface card that is communicatively coupled to the particular TCP offload engine.

15. The high bandwidth peer-to-peer switched key-value system of claim 9, wherein the south cluster further includes:

a low bandwidth south cluster fabric communicatively coupled to the south cluster root fabric, and configured to receive and transmit internet protocol (IP) blocks, wherein the south cluster bus is a high bandwidth south cluster bus having a bandwidth that is higher relative to the low bandwidth south cluster fabric, and wherein the peer-to-peer switched key-value section includes a high bandwidth switch having a bandwidth that is higher relative to the low bandwidth south cluster fabric.

16. A high bandwidth peer-to-peer switched key-value system, comprising:

an application space including one or more applications and one or more external libraries;

a north cluster including one or more processor cores, a system memory, and a memory controller configured to control the system memory;

a south cluster including:

a south cluster root fabric;

a south cluster bus communicatively coupled to the south cluster root fabric, the south cluster bus having a plurality of ports; and a peer-to-peer switched key-value section communicatively coupled to a port from among the plurality of ports of the south cluster bus, the peer-to-peer switched key-value section being configured to communicate with the one or more applications or the one or more external libraries via the north cluster;

wherein the peer-to-peer switched key-value section further includes:

a switch;

a plurality of network interface cards communicatively coupled to the switch;

one or more key-value caches configured to store a plurality of key-values;

one or more memory controllers communicatively coupled to the one or more key-value caches and to the plurality of network interface cards, the one or more memory controllers including a key-value peer-to-peer logic section that is configured to coordinate peer-to-peer communication between (a) the one or more memory controllers and (b) the plurality of network interface cards through the switch; and a plurality of transmission control protocol (TCP) offload engines each communicatively coupled to a corresponding one of the network interface cards, each of the TCP offload engines including a packet peer-to-peer logic section that is configured to coordinate the peer-to-peer communication between (a) the one or more memory controllers and (b) the plurality of network interface cards through the switch;

wherein:

the packet peer-to-peer logic section for a particular TCP offload engine from among the plurality of TCP offload engines is configured to receive a packet, to decode the packet, to extract a key and a command, and to create a peer-to-peer query packet, the peer-to-peer query packet includes the key, the command, a destination identifier (ID), and a source identifier (ID), and the packet peer-to-peer logic section for the particular TCP offload engine is configured to:

associate the destination ID of the peer-to-peer query packet with a memory controller from among the one or more memory controllers; and associate the source ID of the peer-to-peer query packet with a corresponding network interface card that is communicatively coupled to the particular TCP offload engine; and the key-value peer-to-peer logic section for a particular memory controller from among the one or more memory controllers is configured to:

receive the peer-to-peer query packet from the corresponding network interface card that is communicatively coupled to the particular TCP offload engine;

extract the key from the peer-to-peer query packet;

reference a hash table using the key to determine at least one of a hit or a miss;

responsive to the hit:

determine a value associated with the hit;

create a peer-to-peer return packet including the value; and transmit the peer-to-peer return packet to the corresponding network interface card that is communicatively coupled to the particular TCP offload engine.

17. The high bandwidth peer-to-peer switched key-value system of claim 16, wherein the packet peer-to-peer logic section for the particular TCP offload engine is further configured to:

receive the peer-to-peer return packet from the corresponding network interface card;

create a TCP packet based at least on the peer-to-peer return packet; and transmit the TCP packet.

18. A computer-implemented method for high bandwidth peer-to-peer switched key-value caching, the method comprising:

receiving, by a transmission control protocol (TCP) offload engine, a packet;

decoding, by a packet peer-to-peer logic section of the TCP offload engine, the packet;

extracting, by the packet peer-to-peer logic section, a key and a command from the packet;

creating, by the packet peer-to-peer logic section, a peer-to-peer query packet including the extracted key, the extracted command, a destination identifier (ID), and a source identifier (ID);

associating, by the packet peer-to-peer logic section, the destination identifier (ID) of the peer-to-peer query packet with a memory controller;

associating, by the packet peer-to-peer logic section, the source identifier (ID) of the peer-to-peer query packet with a network interface card that is communicatively coupled to the TCP offload engine;

transmitting, by the packet peer-to-peer logic section, the peer-to-peer query packet;

receiving, by a key-value peer-to-peer logic section of the memory controller, the peer-to-peer query packet;

extracting, by the key-value peer-to-peer logic section, the key from the peer-to-peer query packet;

referencing, by the key-value peer-to-peer logic section, a hash table using the key to determine at least one of a hit or a miss;

responsive to determining the hit:
  determining a value associated with the hit;
  creating a peer-to-peer return packet including the value; and
  transmitting the peer-to-peer return packet to the network interface card that is communicatively coupled to the TCP offload engine;
receiving, by the packet peer-to-peer logic section of the TCP offload engine, the peer-to-peer return packet from the network interface card;
creating, by the packet peer-to-peer logic section, a TCP packet based at least on the peer-to-peer return packet; and
transmitting, by the packet peer-to-peer logic section, the TCP packet.

\* \* \* \* \*